Feb. 9, 1926.

P. H. McCOURT

SPECTACLES

Filed May 9, 1925

Witnesses:—

Inventor:
P. H. McCourt,
His Attorneys.

Patented Feb. 9, 1926.

1,572,733

UNITED STATES PATENT OFFICE.

PATRICK HENRY McCOURT, OF ST. LOUIS, MISSOURI.

SPECTACLES.

Application filed May 9, 1925. Serial No. 29,166.

*To all whom it may concern:*

Be it known that I, PATRICK HENRY Mc-COURT, a citizen of the United States, and a resident of St. Louis, in the State of Missouri, have invented certain new and useful Improvements in Spectacles, of which the following is a specification.

My invention relates to improvements in spectacles, and it consists in the combinations, constructions and arrangements herein described and claimed.

An object of the invention is to provide a pair of spectacles having improved means for retaining the spectacles against accidental displacement from applied position without any discomfort to the wearer of the spectacles.

A further object of the invention is the provision of spectacles having retaining members provided with soft contact members held yieldingly, yet firmly against opposite sides of the head of a wearer, whereby the spectacles will be held against accidental displacement without there being any necessity of making use of ear engaging hooks or loops at the extremities of the retaining members, as is usual.

A further object of the invention is the provision of spectacles having retaining arms or staffs adjustable as to length and thus readily adjustable to fit the head of a wearer of any one of a plurality of different sizes.

Figure 1:
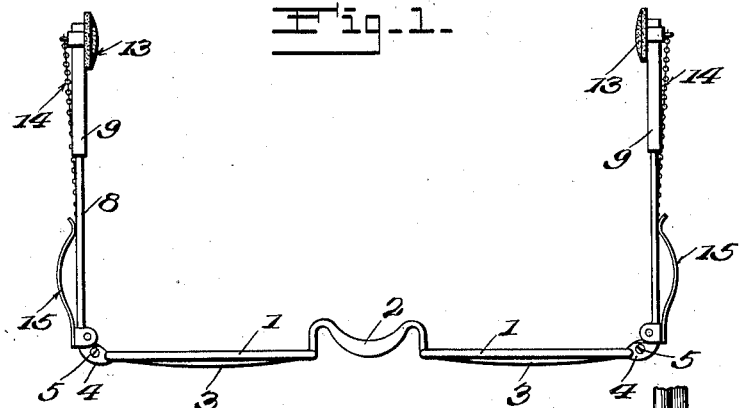
Figure 2:
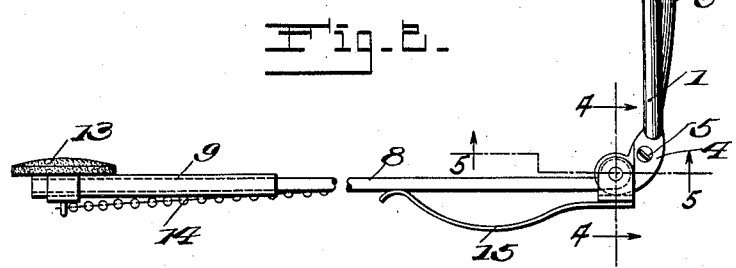
Figure 3:
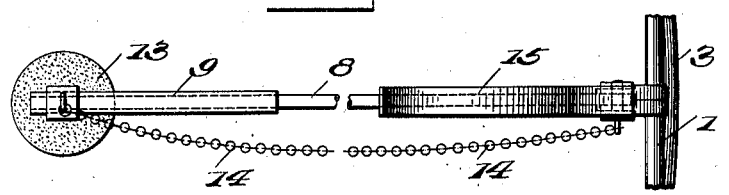
Figure 4:
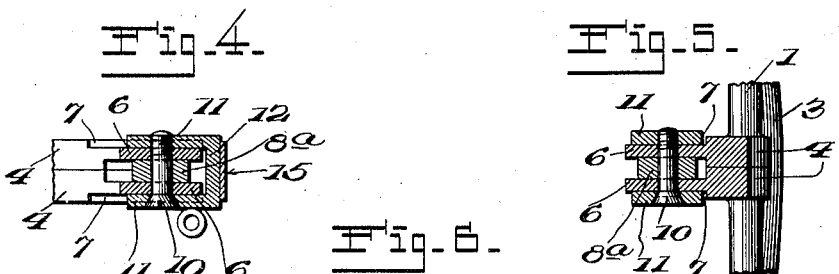
Figure 5:
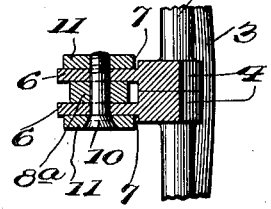
Figure 6:
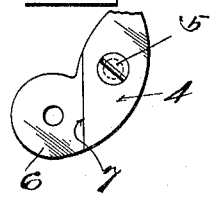

Other objects and advantages of the invention will be apparent from the following description, considered in conjunction with the accompanying drawings, in which Figure 1 is a plan view of the improved spectacles, opened for application, Figure 2 is a relatively enlarged plan view of one of the retaining arms and a portion of the associated lens holding frame of the spectacles, Figure 3 is a side elevation of the structure exhibited in Fig. 2, Figure 4 is a section along the line 4—4 of Fig. 2, Figure 5 is a section along the line 5—5 of Fig. 2, and Figure 6 is a fragmentary plan view, showing the attaching portion for one of the lens holding frames of the spectacles.

The improved spectacles comprise a pair of frame or rim members 1 connected at their adjacent sides by a nose bridge piece 2 and adapted to receive the lenses 3. Each of the frame or rim members 1 has the form of a split ring, the ends of which meet at the side of the frame member which is remote from the nose bridge piece 2. Also, the ends of each frame member 1 meet in the horizontal plane which extends through the points of junction of the nose bridge piece with the frame members 1 and these meeting end portions of each frame member 1 are enlarged outwardly and rearwardly and preferably are flattened as indicated at 4—4 and as best seen in Figs. 3 to 5, inclusive. The enlarged meeting ends 4—4 of each frame member 1 are secured together by a vertical screw 5 or like fastening device and the lens in that frame member thus is retained in place.

The enlarged and flattened end portions 4 of each lens holding frame member 1 are formed with integral rearwardly extending vertically spaced horizontal attaching extensions or ears 6. Rearwardly facing shoulders 7 are formed on the remote faces of the respective attaching extensions 6 on the ends of each lens holding frame member.

A staff or retaining arm is provided for each pair of attaching extensions 6. Each retaining arm is made up of a rod-like supporting section 8 and an outer section 9 which slides on the section 8. The inner end portion of the section 8 of each retaining arm is flattened as indicated at 8ª to fit rather snugly between the attaching ears 6 of the associated lens holding frame member without preventing swinging of the retaining arm between the attaching extensions and about the axis of a vertical pivot element 10. The arms 11 of a substantially U-shaped bracket 12 straddle the attaching ears 6 on the ends of each lens holding frame member 1 and are attached to said ears and to the interposed end 8ª of the associated retaining arm by means of the pivot element 10 which is shown as being a screw extending through alined openings in the parts just mentioned and having threads adjacent to its extremity in engagement with threads in the wall of the opening in one of the arms 11 of the bracket. The arms 11 of the bracket 12 are in contact at their inner side edges with the corresponding shoulders 7 and the web of the bracket is disposed outwardly of the associated attaching ears 6 and substantially in a vertical plane which extends at right angles to the plane of the associated lens holding frame 1.

The section 9 of each retaining arm or staff is held against turning about the axis of the section 8 of the same retaining arm in any suitable known manner, as by having the section 8 formed to be non-circular in cross sectional contour, and the bore of the section 9 correspondingly configured in cross section. The section 9 carries a fixed pad 13 at its inner side. This pad may be made of any suitable relatively soft and compressible material, such as soft rubber. A chain 14 of ornamental appearance is attached at one end to the section 9 and at its other end to the bracket 12 to which the associated section 8 is attached, the length of the chain 14 being slightly less than the length of the sections 8 and 9 combined, whereby the section 9 will be held against being slid completely from the section 8.

A spring 15 of semi-elliptic shape is provided for each retaining arm 8—9. One end of each spring 15 is secured rigidly to the web of the associated bracket 12 and the other end of the spring bears against the outer side of the section 8 of the retaining arm 8—9 which is attached to that bracket and exerts pressure on the retaining arm tending to swing the latter horizontally inward from position to extend substantially at a right angle to the plane of the lens holding frame.

From the foregoing description of the various parts of the device the operation thereof may be readily understood. The brackets 12 are held against swinging about the axes of the pivot elements 10 and the springs which are secured on these brackets therefore will urge the retaining arms 8—9 continuously inward when the respective retaining arms have been swung outward substantially to parallel relation to each other as shown in Fig. 1. The pads 13 at the inner sides of the sections 9 of the retaining arms of the spectacles thus will be held yieldingly against the opposite sides of the head of a wearer of the spectacles and the spectacles will be held in position without discomfort and without engagement of any parts thereof with the ears of the wearer. The retaining arms of the spectacles can be adjusted as to length as desired within limits.

Obviously, the invention is susceptible of embodiment in forms other than that which is illustrated in the accompanying drawings and I therefore consider as my own all such modifications and adaptations thereof as fairly fall within the scope of the appended claims.

I claim:

1. Spectacles comprising lens holding means, extensible head engaging arms carried by the lens holding means, each of said arms comprising a pair of telescopic slidably co-engaged sections and a chain having a length slightly less than the combined length of said sections, the ends of said chain being connected to the opposite end portions of said sections and said chain thus being adapted to limit the relative movement of said sections in opposite directions.

2. Spectacles comprising split ring frame members for holding lenses, each having the meeting ends thereof at its outer side, a nose bridge piece connecting the inner sides of the lens holding frame members, a fastening device connecting the ends of each lens holding member to retain the lens therein, said ends of each lens holding member having spaced attaching extensions and having shoulders at the junctures of said end portions of the lens holding member and the attaching extensions thereon, said shoulders being at the remote faces of said attaching extensions, substantially U-shaped brackets having arms straddling the attaching extensions on the lens holding members, the webs of said brackets being remote from said lens holding members and the arms of said brackets abutting said shoulders, retaining arms having their inner end portions received between the attaching extensions, pivot elements connecting the associated bracket arms, attaching extensions, and retaining arm together, and semi-elliptic springs having their inner end portions secured on the webs of said brackets and having their outer ends bearing against the outer sides of said retaining arms.

3. Spectacles comprising split ring frame members for holding lenses, each having the meeting ends thereof at its outer side, a nose bridge piece connecting the inner sides of the lens holding frame members, a fastening device connecting the ends of each lens holding member to retain the lens therein, said ends of each lens holding member having spaced attaching extensions and having shoulders at the junctures of said end portions of the lens holding member and the attaching extensions thereon, said shoulders being at the remote faces of said attaching extensions, substantially U-shaped brackets having arms straddling the attaching extensions on the lens holding members, the webs of said brackets being remote from said lens holding members and the arms of said brackets abutting said shoulders, retaining arms having their inner end portions received between the attaching extensions, pivot elements connecting the associated bracket arms, attaching extensions, and retaining arm together, semi-elliptic springs having their inner end portions secured on the webs of said brackets and having their outer ends bearing against the outer sides of said retaining arms and pads on said retaining arms at the inner sides thereof.

PATRICK HENRY McCOURT.